United States Patent [19]

Nussbaum

[11] 4,348,671

[45] Sep. 7, 1982

[54] DUAL SPECTRA WELL LOGGING SYSTEM

[75] Inventor: Theodore W. Nussbaum, Houston, Tex.

[73] Assignee: Texaco Inc., White Plains, N.Y.

[21] Appl. No.: 210,881

[22] Filed: Nov. 28, 1980

[51] Int. Cl.³ .......................... G01V 1/40; G01V 5/00
[52] U.S. Cl. ..................................... 340/853; 250/262
[58] Field of Search ............................ 367/28, 30, 34;
181/105, 107; 250/256, 261, 262, 264, 265;
340/856; 33/312; 324/30 B

[56] References Cited

U.S. PATENT DOCUMENTS

| | | | |
|---|---|---|---|
| 3,681,601 | 8/1972 | Papp et al. | 367/28 |
| 3,916,685 | 11/1975 | Paap et al. | 250/262 |
| 3,959,648 | 5/1976 | Pitts et al. | 250/262 |
| 3,980,881 | 9/1976 | Veach et al. | 250/261 |
| 3,990,297 | 11/1976 | Palet et al. | 250/256 |
| 4,122,338 | 10/1978 | Smith et al. | 250/265 |

FOREIGN PATENT DOCUMENTS 1071416  6/1967  United Kingdom ............... 181/107

Primary Examiner—Nelson Moskowitz
Attorney, Agent, or Firm—Carl G. Ries; Robert A. Kulason; Ronald G. Gillespie

[57] ABSTRACT

A dual spectra well logging system includes a well logging tool which is adapted to pass through a bore hole in an earth formation. The well logging tool includes at least two sensors which sense at least one condition of the earth formation and provides corresponding pulse signals. A circuit connected to the sensors provides a combined pulse signal wherein the pulses of the pulse signal from one sensor has one polarity and the pulses of the pulse signal from the other sensor has pulses of an opposite polarity. A circuit applies the combined pulse signal to a well logging cable which conducts the combined pulse signal to the surface of the earth formation. Surface apparatus includes a network connected to the cable which provides control signals in accordance with the polarity of the pulses in the combined pulse signal. A network connected to the cable inverts the combined pulse signal and provides a combined pulse signal and an inverted combined pulse signal. A first switching network receiving the combined pulse signal passes the pulses derived from the pulses of the one polarity in acccordance with the control signals to provide a first pulse signal while a second switching network receiving the inverted combined pulse signal passes the pulses derived from the pulses of the opposite polarity in accordance with the control signals to provide a second pulse signal. An output network processes the two pulse signals to provide an indication of the earth's condition in accordance with the processed pulse signals.

7 Claims, 2 Drawing Figures

DUAL SPECTRA WELL LOGGING SYSTEM

BACKGROUND OF THE INVENTION

1. Field of the Invention

The present invention relates to well logging systems in general and, more particularly, to dual spectra well logging systems.

2. Summary of the Invention

A dual spectra well logging system includes a well logging tool adapted to pass through a bore hole in an earth formation. The well logging tool includes at least two sensors which sense at least one condition of the earth formation to provide pulses corresponding in frequency and pulse height to the sensed condition. A pulse signal network combines the pulses in a manner to provide a combined pulse signal in which the pulses from one sensor has one polarity and the pulses from the other sensor has an opposite polarity. A network provides the combined pulse signal to a cable which conducts the combined pulse signal to the surface of the earth's formation. A control signal circuit provides control signals in accordance with the polarity of the pulses of the combined pulse signal. Another network inverts the combined pulse signal to provide a combined pulse signal and an inverted combined pulse signal. A first switching network is controlled by the control signals to pass the pulses in the combined pulse signal derived from the pulses of the one sensor to provide a first pulse signal. A second switching network passes the pulses in the inverted combined pulse signal derived from the pulses from the other sensor in accordance with the control signals to provide a second pulse signal so that the two switching networks provide two pulse signals having the same polarity. An output network provides an output corresponding to the sensed condition of the earth formation in accordance with the first and second pulse signals from the switching networks.

DESCRIPTION OF THE INVENTION

Figure 1:
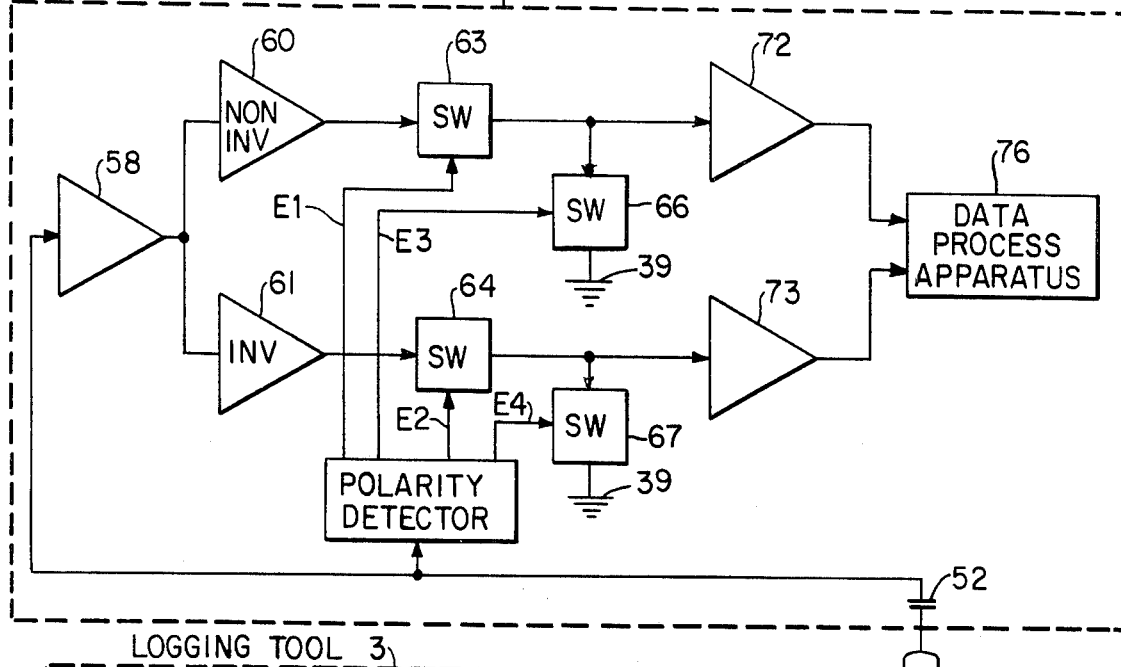
FIG. 1 depicts the surface electronics and logging tool electronics.

Referring to FIG. 1, a dual spectra logging tool comprises a logging tool 3 which includes detector means 7, 9. Detector means 7, 9 may be scintillation type detectors detecting various types of radiation from an earth formation which may be natural radiation of the formation or radiation resulting from neutron bombardment of the earth formation from a neutron source not shown. The detector means 7, 9 provide data pulses corresponding in pulse height and frequency to the detected radiation.

The data pulses from detector means 7 are provided to an inverting input 12 of an operational amplifier 15 through a resistor 18. The data pulses from detector means 9 are provided to a non-inverting input 20 of amplifier 15 through a resistor 24. A feedback resistor 26 connects an output 28 of amplifier 15 to input 12. Input 20 is connected to a ground 31 through a resistor 34.

A combined pulse signal provided amplifier 15 consists of positive pulses resulting from data pulses provided by detector means 9 and negative pulses resulting from data pulses provided by detector means 7. The pulses from amplifier 15 are provided to a cable driver 39 which in turn provides the pulses to a conductor 43 of a well logging cable 45 through a blocking capacitor 48. Cable 45 conducts the pulses uphole to surface electronics 50.

The combined pulse signal from conductor 43 is applied through another blocking capacitor 52 in the surface electronics 50 to a polarity detector 55 and to a main amplifier 58. The output from amplifier 58 is applied to buffer amplifiers 60, 61 which provides them to switch 63. Buffer amplifier 61 inverts the combined pulse signal to provide an inverted combined pulse signal to switch 64. It should be noted that at this time pulse separation has not taken place.

Polarity detector 55 provides control signals E1 through E4 to switches 63, 64, 66 and 67 respectively. Switches 63 and 64 are electronic single pole, single throw switches controlled by signals E1 and E2, respectively, to block or pass the pulses from buffer amplifiers 60 and 61, respectively. Switches 66 and 67 are connected between the inputs of driver amplifiers 72 and 73, respectively, and ground 39. Switches 66, 67 are also electronic single pole, single throw switches. Switches 66, 67 will either have no effect on the signals passed by switches 63 and 64, respectively, provided to amplifiers 72 and 73, respectively, or ground the inputs of amplifiers 72 and 73, respectively, when switches 63, 64 do not pass signal, in accordance with signals E3 and E4, respectively. The outputs from amplifiers 72, 73 are provided to conventional type data process apparatus 76 for analysis and recording.

Figure 2:
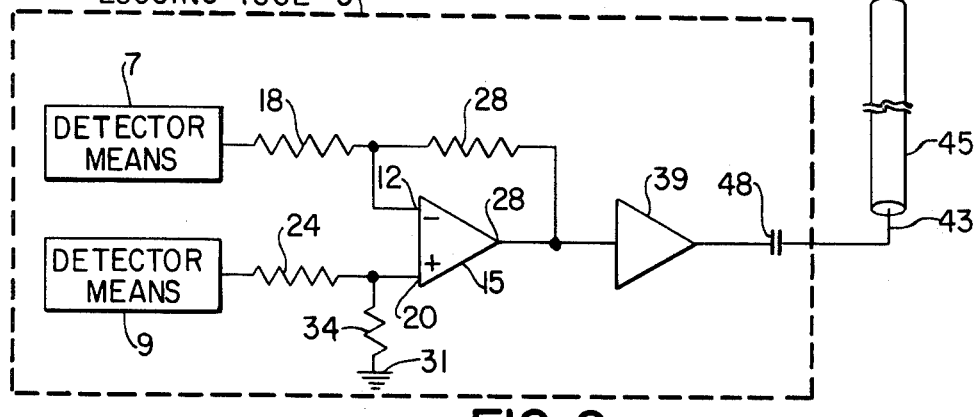
FIG. 2 depicts the polarity detector of the invention.
Figure 2:
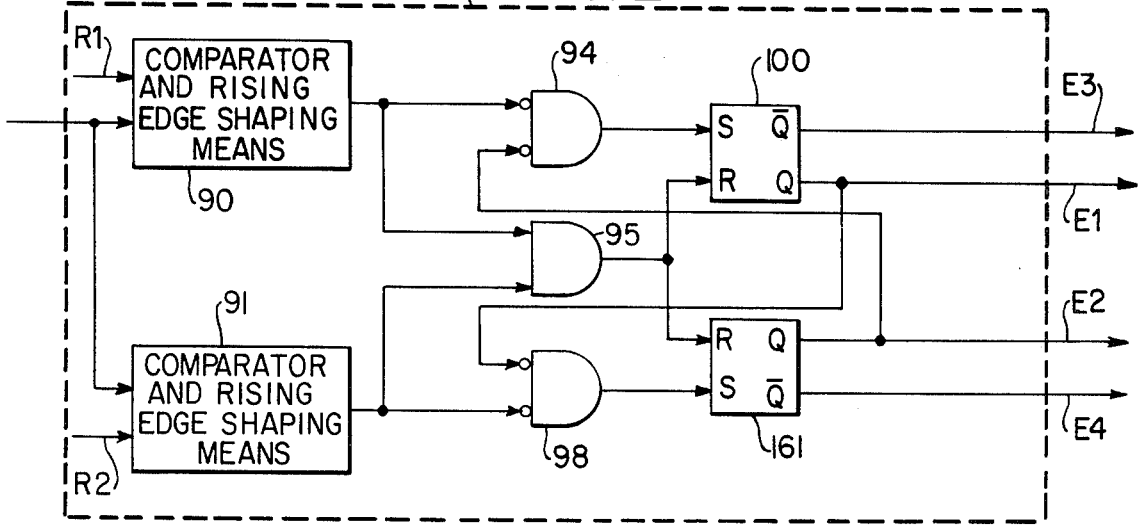

Referring now to FIGS. 1 and 2, the combined pulse signal passing through blocking capacitor 52 is applied to comparator means 90, 91 receiving reference voltage R1 and R2, respectively. Essentially, R1 and R2 define a zero voltage condition and the function of comparator means 90, 91 is to make a determination as to whether a pulse in the combined pulse signal is positive going or negative going. The output from comparing means 90 is applied to a negative-positive AND gate 94 and to an AND gate 95. AND gate 94 provides a high logic level output when both inputs to AND gate 94 are at low levels and a low logic level output when one or none of the inputs are receiving a low logic level signal. AND gate 95 provides a high logic level output when it receives two high logic level signals and provides a low logic level output when one or none of the signals received are at a high logic level. The output from comparator means 91 is provided to AND gate 95 and to a negative-positive AND gate 98. The outputs from AND gates 94, 98 are provided to the set inputs of flip-flops 100 and 101, respectively, while the output from AND gate 95 is applied to the reset inputs of flip-flops 100, 101.

Flip-flops 100, 101 provide signals E1 and E2, respectively, at their Q outputs and signals E3 and E4, respectively, at their $\overline{Q}$ outputs, respectively. When in the set state, flip-flops 100, 101 provide signals E1 and E2, respectively, at high logic levels and signals E3 and E4, respectively, at low logic levels. Flip-flops 100, 101 provide signals E1 and E2, respectively, at low logic levels and signals E3 and E4, respectively, at high logic levels when in the clear state. Signals E1, E2 are also provided to the inputs of AND gates 94 and 98, respectively.

Initially in operation, flip-flops 100, 101 are in a clear state. The low logic level signals E1, E2 from flip-flops 100 and 101, respectively, partially enable AND gates 98 and 94, respectively. Comparator means 90, 91 initially provide high logic level outputs. A positive going data pulse in the combined pulse signal causes comparator means 90 to provide a low logic level output which in turn causes the partially enabled AND gate 94 to provide a high logic level signal. The change to a high logic level of AND gate 94 signal triggers flip-flop 100 to a "set" state, thereby causing signal E1 to go to a high logic level to disable AND gate 98 and to render switch 63 conductive. Signal E3, not at low logic level, causes switch 66 to disconnect the input of amplifier 72 from the ground so that the positive going pulse follows the signal path formed by amplifiers 58, 60 and 72 and conductive switch 63 to be processed by conventional data processing apparatus 76.

When the output from comparator means 90 went to a low logic level, AND gate 95 was disabled and provided a low logic level output. Upon termination of the entire positive going pulse, comparator means 90 signal changes to a high logic level, thereby disabling AND gate 94 and causing the signal from AND gate 95 to go to high logic level. The change in AND gate 95 output to the high logic level triggers flip-flop 100 to the "clear" state, thereby causing switch 63 to be rendered non-conductive and controlling switch 66 to connect the input of amplifier 72 to ground 39 so that amplifier 72 provides a zero amplitude signal.

A negative going pulse would have similar results in that due to operation of comparator means 91, And gate 98 and flip-flop 101, switch 64 is rendered conductive while switch 67 is controlled to connect the input of amplifier 73 to the output of switch 64. It should be noted that the negative going pulse in the combined pulse signal is provided to data processing apparatus 76 as a positive going pulse due to the inverting effect of amplifier 61.

The well logging system as hereinbefore described is a dual spectra well logging system that provides the transmission of data pulses from two different detectors on the same conductor.

What is claimed is:

1. A dual spectra well logging system comprising
a well logging tool adapted to be passed through a bore hole in an earth formation including
at least two sensing means for sensing at least one condition of the earth formation and providing pulse signals corresponding to the sensed condition,
means connected to both sensing means for providing a combined pulse signal in which the pulses of the pulse signal from one sensing means has one polarity while the pulses of the pulse signal from the other sensing means has an opposite polarity, and
means for applying the combined pulse signal to cable means;
cable means connected to the applying means in the well logging tool for conducting the combined pulse signal from the well logging tool within the bore hole to the surface of the earth formation; and
surface apparatus includes
means connected to the cable means for providing control signals in accordance with the polarity of pulses in the combined pulse signal,
means for amplifying the combined pulse signal,
inverting means connected to the amplifying means for inverting the first combined pulse signal to provide an inverted combined pulse signal,
first switch means receiving the combined pulse signal means and to the control signal means for passing the pulses of the combined pulse signal derived from the pulses of one polarity in accordance with the control signals,
second switching means connected to the inverted combined pulse signal means and to the control signal means for passing the pulses of the inverted combined pulse signal derived from the pulses of the opposite polarity, and
output means connected to both switching means for providing an output corresponding to the sensed condition of the earth formation in accordance with the pulses from both switching means.

2. A well logging system as described in claim 1 in which the control signal means includes means for determining in the polarity of each pulse in the combined pulse signal and providing a corresponding signal, and
logic means connected to the determining means for providing the control signals in accordance with the signals from the determining means.

3. A well logging system as described in claim 2 in which the determining means includes
a first comparator means connected to the cable means and receiving a first reference signal for comparing the combined pulse signal with the first reference signal and providing a corresponding first comparison signal,
and
a second comparator means connected to the cable means and receiving a second reference signal for comparing the combined pulse signal with the second reference signal and providing a corresponding second comparison signal and wherein the first and second reference signal substantially define a zero amplitude for the combined pulse signal.

4. A well logging system as described in claim 3 in which the logic means includes
first and second negative-positive AND gates connected to the first and second comparator means, respectively,
an AND gate connected to the first and second comparator means,
first flip-flop means having a set input connected to the output of the first negative-positive AND gate, an R input connected to the output of the AND gate, a Q output connected to an input of the second negative-positive AND gate, and $\bar{Q}$ and Q outputs connected to the first switching means for providing the control signals to the first switching means in accordance with signals received at its inputs, and
second flip-flop means having a set input connected to an output of the second negative-positive AND gate, an R input connected to the output of the AND gate, a Q output connected to an input of the first negative-positive AND gate, and Q and $\bar{Q}$ outputs connected to the switching means for providing control signals to the switching means in accordance with signals received at its inputs.

5. A well logging system as described in claim 4 in which the first switching means includes
a first single pole, single throw switch means receiving the combined pulse signal and being connected to the Q output of the first flip-flop means for being controlled by the control signal appearing to the Q output of the first flip-flop means to block or pass the combined pulse signal, a first buffer amplifier means connected to the output means for providing received pulses to the output means, and a second single pole, single throw switch means connected to the first single pole, single throw switch means, to the first buffer amplifier means and to ground for not affecting passed pulses from the first single pole, single throw switch means being provided to the first buffer amplifier means and for grounding the input to the first buffer amplifier means when the first single pole, single throw switch means is not rendered conductive in accordance with the control signal appearing at the Q output of the first flip-flop means.

6. A well logging system as described in claim 5 in which the second switching means includes a third single pole, single throw switch means connected to the inverting means and to the Q output of the second flip-flop means for being controlled by the control signal appearing at the Q output of the second flip-flop means to block or pass the inverted combined pulse signal from the inverting means, a second buffer amplifier means connected to the output means for providing received pulses to the output means, and a fourth single pole, single throw switch means connected to the third single pole, single throw switch means, to the second buffer amplifier means and to ground for not affecting passed pulses from the second single pole, single throw switch means being provided to the second buffer amplifier means and for grounding the input to the second buffer amplifier means when the second single pole, single throw switch means is not rendered conductive in accordance with the signal appearing at the Q output of the second flip-flop means.

7. A well logging system as described in claim 6 in which the combined signal means includes an operational amplifier having an inverting input and a non-inverting input and an output, a first resistor connecting the first sensing means to the inverting input, a second resistor connecting the second sensing means to the non-inverting input of the operational amplifier means, a feedback resistor connecting the output of the operational amplifier to the inverting input of the operational amplifier, and a third resistor connecting the non-inverting input of the operational amplifier to ground.

* * * * *